April 7, 1953 L. SUVERKROP 2,633,639
SURVEYING INSTRUMENT
Filed Oct. 30, 1945 3 Sheets-Sheet 1

Lew Suverkrop
INVENTOR.

BY
ATTORNEY.

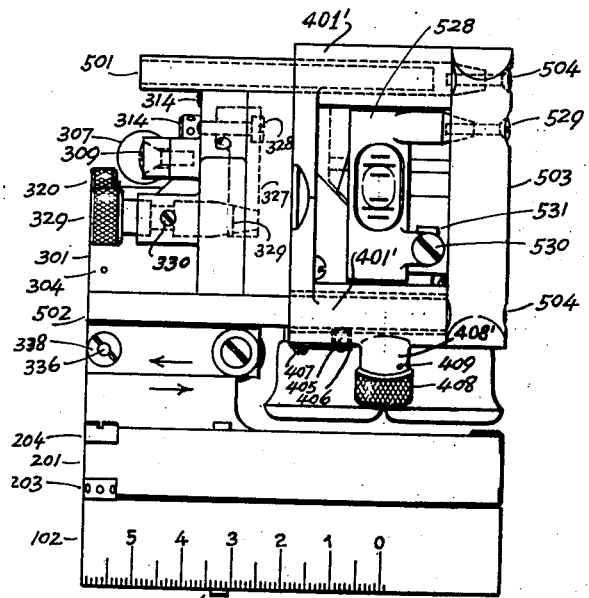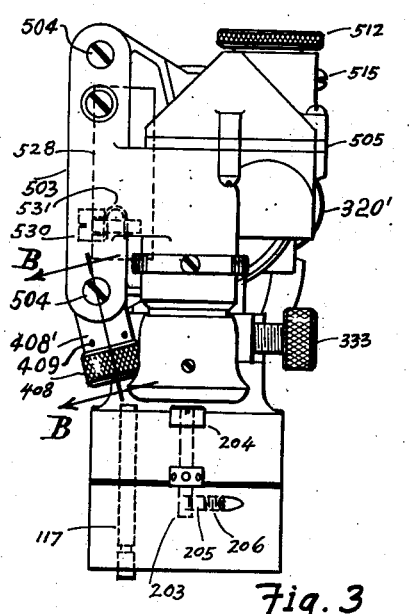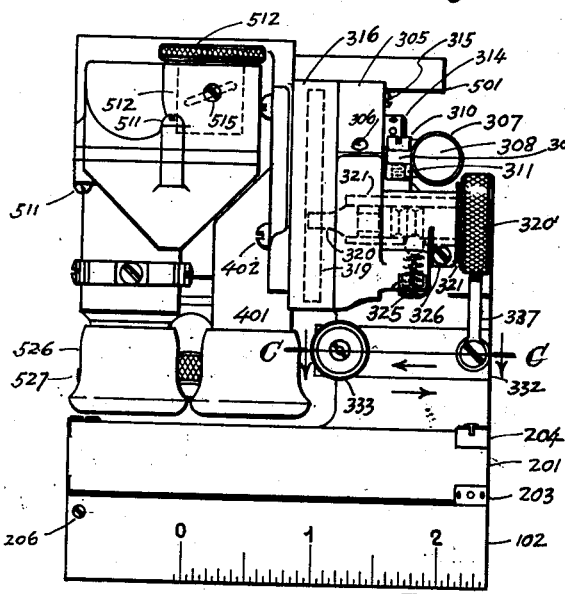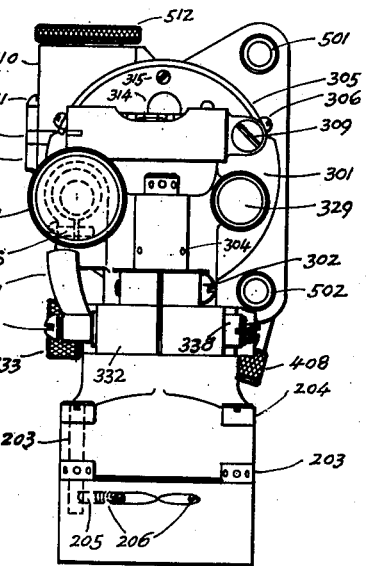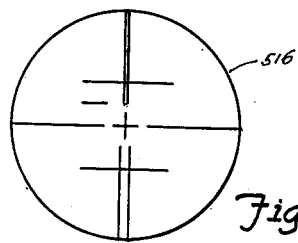

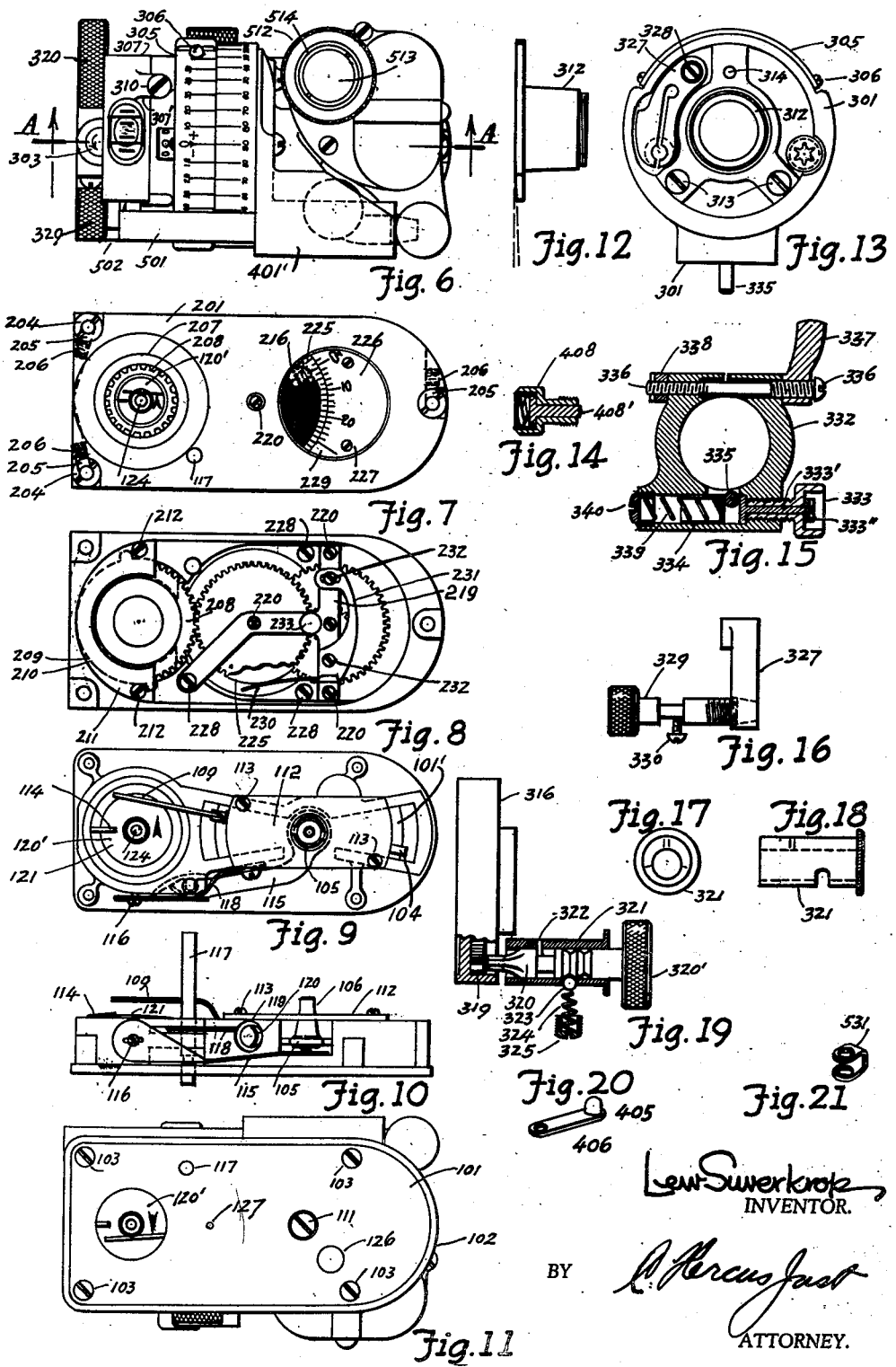

Patented Apr. 7, 1953

2,633,639

UNITED STATES PATENT OFFICE 2,633,639

SURVEYING INSTRUMENT

Lew Suverkrop, Bakersfield, Calif.

Application October 30, 1945, Serial No. 625,549

5 Claims. (Cl. 33—72)

This invention relates to improvements in surveying instruments and more particularly, but without limitation, to improvements in the surveying instrument shown in my prior patent, No. 2,231,036, issued February 11, 1941. The latter instrument is characterized as a "pocket" transit and the features included therein resulted in a precision instrument having a high degree of accuracy combined with versatility and portability. Said instrument may be either hand-held or supported on a tripod and performs the functions of substantially all common surveying instruments including: Transit; level, plane table alidade; compass; hand level; Abney level; clinometer; bubble sextant; and the like.

The present invention has resulted from further development of the basic instrument described in said patent for purposes of increasing its accuracy, lessening its cost of manufacturing, improving the speed and convenience of its operation, and extending the fields of usefulness of its various functions.

One of the principal objects of the present invention is to provide a trough compass arranged to facilitate quickly and accurately damping the needle thereof to bring it to rest.

Another object is to provide an improved type of pivoted compass needle and mounting therefor, whereby more accurate reading of the same relative to an index may be achieved.

A further object of the invention is to provide in a small transit, capable of being manually supported, a sighting system including the aforementioned compass and needle, whereby the needle may be observed in relation to the object observed and a level.

Details of the invention as well as details of all the foregoing objects of the invention and other objects of the invention are described in the following specification and illustrated in the accompanying drawings forming a part thereof and in which:

Figs. 2, 3, 4 and 5 are respectively vertical elevations of all four sides of the instrument.

Fig. 6 is a top plan view of the instrument.

Fig. 7 is a top plan view of the base portion of the instrument showing an indication of horizontal angle.

Fig. 8 is a top plan view of the horizontal angle indicating mechanism located within the base portion of the instrument.

Figs. 9 and 10 show the trough compass in top plan and side elevation, respectively.

Fig. 11 is a bottom plan view of the instrument.

Fig. 12 is a side elevation of the horizontal spindle per se.

Fig. 13 is a side elevation view of the "head" of the instrument showing details used in control and movement of the telescope about the horizontal axis.

Figure 1:
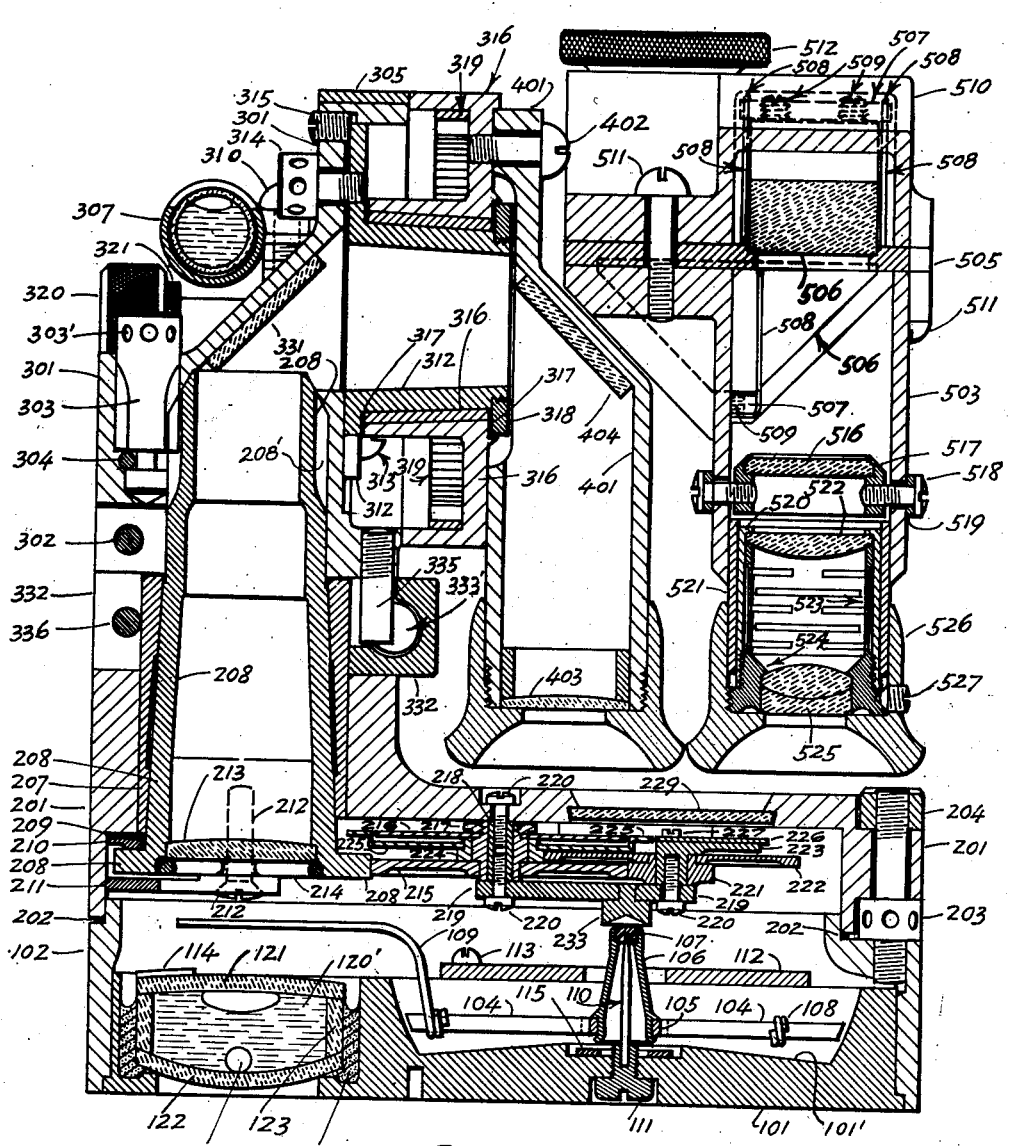
Fig. 1 is an enlarged vertical cross section of the instrument taken on the line A—A in Fig. 6.

Fig. 14 is a sectional view of the "P. D. Screw" per se, taken on line B—B of Fig. 3, said screw being used for maintaining the pupil distance of the eye-pieces of the instrument.

Fig. 15 is a sectional view taken on the line C—C in Fig. 4, and showing details of the horizontal angle clamp and mechanism for effecting slow motion of the telescope about the vertical spindle.

Fig. 16 is a side elevation view of details comprising the vertical circle clamp screw and shoe.

Figs. 17 and 18 are respectively detail end and side views of the vertical circle slow motion adjusting bushing.

Fig. 19 is a detached view, partially in cross section, of the mechanism for effecting slow motion of the telescope about the horizontal axis.

Fig. 20 is a perspective view of the sight guide friction spring.

Fig. 21 is a perspective view of the level tension spring.

Fig. 22 is a diagram of a reticule pattern for the instrument.

Figures 1 through 22 illustrate a transit device comprising as stated hereinabove, a highly desirable improvement over the device forming the subject matter of said aforementioned Patent No. 2,231,036 in that the improved device has greater accuracy, may be operated with greater speed and convenience, and has greatly extended fields of usefulness due principally to accessories and attachments therefor comprising parts of the present invention.

The improved transit device, unless otherwise indicated, will hereinafter in this specification and in the appended claims be referred to as the "instrument." It is composed of a plurality of closely associated and interdependent items, elements, or units which cooperate to perform with precision and accuracy those functions which any complete transit may be expected to perform. The present instrument is capable of the accuracy of precise transits, levels, etc., of much larger size and, in addition, may be used to perform other functions such as, for example, quick sighting when held to the eye as a pair of binoculars, of which other instruments of larger size are entirely incapable.

Trough compass

Referring particularly to Figures 1, 7, 9, 10 and 11 of the drawings, the trough compass includes the casting 101 which is held into the base 102 of the instrument by means of screws 103 (Fig. 11). The compass needle comprises magnets 104 which may be held by means of an iron ring 105; a hub 106 carrying a bearing jewel 107; an adjustable counterpoise 108; and a pointer 109 preferably of fine tubing. It is preferable that the needle be constructed with low center of gravity as shown by providing a pivot substantially above the magnets 104; and having due regard for relative importance of weight and magnetic moment in relation to sensitivity of magnetic needles, materials should be chosen to give optimum conditions of minimum weight and maximum magnetic flux. At the same time, the latter considerations may be subject to some modification in considering the part that the magnetic flux serves in damping the needle, as will appear further on. The needle is supported by a hard pivot 110 fixed in the pivot screw 111 which may be changed from the outside of the instrument without opening it.

The casting 101 is provided with an elongated trough 101' to accommodate the compass needle as shown in Figs. 1 and 9. The trough cavity should be of the smallest size which will permit free movement of the needle within angular limits desired. As shown in the illustrations, the end surfaces of the trough are segments of a sphere whose center is at the seat of the jewel 107, and the air gap between these surfaces and the ends of the magnets 104 is made small. In the illustrations, provision is made for the needle to swing through an arc of about 10° on each side of the center of the trough. Material of high electrical conductivity, and generous cross sections, are both conditions desirable in the casting 101 so as to minimize resistance to flow of electricity through it. In plan view, as shown in Fig. 9, the outline of the trough 101' is defined by the extreme positions of the compass needle when moved about 5° either side of the longitudinal axis of the trough 101', or through a total arc of approximately 10°. Such plan view somewhat resembles a pair of fan blades. The trough cover plate 112, attached by means of screws 113, is preferably provided so as further to surround the magnets closely with a conductor offering little resistance to the flow of electricity. This construction is of importance in the electrical damping of the needle due to Foucault currents operating as follows:

Whenever there is a movement of the needle with respect to the casting 101, the magnetic lines of force of the magnets 104 cut the electrical conductor formed by the casting 101. This induces the flow of electricity in that conductor. Since a flow of electricity is always accompanied by a magnetic field surrounding its conductor, this movement instantly results in a new magnetic field apart from that of the magnets 104. In obedience to the law respecting conservation of energy (without which impossible perpetual motion would be possible) the secondary magnetic field operates in direction opposite to that of the magnets 104 and tends to stop movement of the needle. This method of damping is ideal for two reasons. In the first place, when the needle is at rest with respect to the trough—its desired condition—the damping force is zero. Therefore nothing operates against movement of the needle so as to reduce its sensitivity as there is, for example, in liquid compasses. Second, the greater the movement of the needle, the more the damping effort and the tendency to bring the needle to rest. Because of this, tests show that with a properly designed trough compass constructed of commercially available materials according to this specification, the needle is extremely sensitive and yet will come to rest after 6 half-swings or less, compared with more than 50 half-swings where this damping means is omitted, other conditions being the same.

A piece of the same tubing material used for the pointer 109 provides a convenient index 114 to indicate the central position of the needle. It is preferable to have the axis of the horizontal part of the pointer 109 extend through the jewel seat as indicated in Fig. 1. With that construction, lateral "dancing" of the needle about the point on which it is supported within a plane transverse to the longitudinal axis of the needle causes the pointer merely to oscillate about its axis. In observing the pointer from above, this oscillation is not seen, eliminating the confusion due to the lateral dancing of the needle; whereby the apparent width of the pointer 109 or the apparent position thereof in a horizontal circle about the pivot 110 is unaffected.

The index 114 is placed so that its axis is directed toward the needle's pivot axis, and so that its end extends slightly under the pointer 109. The free ends of both index 114 and pointer 109 should be cut off sharply square. When viewed from a single position above, or viewed with lenses to eliminate parallax, this construction provides for quickly noting when the needle pointer 109 is precisely at the index 114. When central in the trough, the index 114 and the pointer 109 appear as a single unbroken line having the width of the tubing material, and any slight deflection from central position is readily detected due to the offset or ragged breaks in the edges of that line.

When not in use, the needle is lifted from its pivot 110 by means of a needle lifter 115 which has its fulcrum in the needle pivot screw 116 in the trough casting 101. The needle lifter 115 may be actuated from outside the instrument by means of a needle lifter pin 117 which extends through the body of the instrument as shown in Figs. 2 and 3. As indicated in Figs. 9 and 10, a recess with two lips formed in one edge of the needle lifter 115 fits into a groove in the needle lifter pin 117, forming a flexible joint. The needle lifter 115 may be made of thin spring brass. The boss in the trough casting 101 which is drilled to serve as a guide for the needle lifter pin 117 has two slots; one of the slots provides for the joint between the needle lifter pin 117 and the needle lifter 115, and the other slot permits the needle lifter retaining spring 118 to press against the needle lifter pin 117. The needle lifter retaining spring 118 serves to hold the needle in either the "up" or "down" position, with respect to the needle pivot 110, and preferably has just sufficient tension for that requirement and so as to permit the needle lifter pin 117 automatically to raise the needle when the instrument is placed in its carrying case. The needle lifter retaining spring 118 is held to the base by the washer 119 and the screw 120.

The trough may be equipped with a level for adjusting any plane surface supporting the instrument or for leveling the instrument when used by supporting it manually. The circular level 120' shown in Fig. 1 operates according to the principles given in the aforementioned patent. As shown here, it is preferably constructed of two glass lenses of different radii, 121 and 122, fused to a central glass ring, 123, making a permanent, hermetically sealed closure for the bubble, liquid, and ball 124. The ball 124 is preferably a highly polished sphere of hard, extremely dense material such as a platinum-iridium alloy. Plaster 125 or other suitable cementing material serves to hold the level in place.

*Goniometer assembly*

The goniometer housing 201 is recessed to receive a flange or lip formed at the upper edge of the base 102. A gasket 202, in the form of a rubber band, for example, seals the joint. The parts are preferably finished together so that the side surfaces will be continuous and at right angles to the bottom of the instrument. The vertical sides may be marked with English and metric scales as indicated in Figs. 2 and 4. The parts are held together by means of the vertical axis adjusting screws 203 and nuts 204 which also serve to adjust the vertical axis of the instrument with respect to the bottom surface. So that the trough compass may be opened without disturbing the vertical axis adjustment, the retaining shoes 205 and screws 206 (Figs. 3, 4 and 5) may be provided. The retaining shoe 205 is milled to provide the concave end with a surface adapted to the thread of the screw 203 and its diameter is sufficiently less than the diameter of the hole carrying it so as readily to permit proper threaded contact.

A bell metal or hard bronze bushing 207 is fixed within a suitable opening within housing 201 and is provided with a tapered vertical hole which receives the bronze vertical spindle 208 whose fit within the tapered hole is adjusted by means of the vertical spindle adjusting shims 209 supporting the thrust washer 210 against which the shoulder of the spindle 208 bears. Retaining yoke 211, held by screws 212 (Figs. 1 and 8), keeps the spindle 208 in place. A lens 213 is held into the spindle 208 by means of split ring 214 and serves a double purpose; to reduce parallax in the view of the compass and level, and to complete the seal of the base of the instrument against dust and moisture as will be explained in greater detail hereinafter. The shoulder of the spindle 208 is toothed to engage with the geared goniometer.

The gear on the spindle 208 engages with the first wheel 215 of the goniometer. The upper end of the hub of first wheel 215 has a seat and a key to receive the disk 216 which is held in place by the nut 217. The first wheel rotates on the shaft 218 which is supported by the goniometer case 201 above and the goniometer plate 219 below, through the goniometer screws 220. First wheel 215 drives the first pinion 221 which is integrally secured to the second wheel 222, and rotates on a hub extending from the vernier base 223. The second wheel 222 engages with the second pinion 224 which is integral with the disk 225. Disks 216 and 225 are figured to indicate angle against the index figures on the vernier plate 226 which is adjustable laterally against the disk 225 and is held on the vernier base 223 by means of the vernier screws 227.

One part of the goniometer plate 219 bridges across the width of the instrument and is secured to the vernier base 223 by means of goniometer screws 220. The other end of the goniometer plate 219 and the vernier base are anchored to the goniometer case 201 by means of three screws 228. By removing these three screws 228 and by removing the goniometer screw 220 from the top of the goniometer case 201 the goniometer movement as an integral unit may be removed from the instrument.

A glass window 229 in the top of the goniometer case 201 is provided for viewing the reading on the goniometer. As shown in Fig. 7, it is preferable to obscure part of the glass by blacking or sandblasting so as to eliminate figures not essential to the angle reading. In the form shown, the inner disk 216 indicates tens of degrees, the outer disk 225 indicates single and half degrees, and the vernier is divided to indicate units of two minutes. As shown in Fig. 7, the angle reading is 272° 46'. The 27 on the inner disk 216 has passed the small pointer formed by the black surface of the glass window 229, indicating an angle more than 27 "tens" of degrees or 270°; the 2 and the following half-degree or 30' mark have passed the zero index mark on the vernier, indicating more than 2°30' which must be added to the 270° previously noted, making a total indication of more than 272°30'; and on the vernier the 16 graduation is indicated by one of the lines on the outer disk 225 so that 16' must be added to the previous indication of 272° 30', making a total reading of 272° 46'. Accuracy and consistency in readings are considerably improved by applying slight friction to the final rotating member of the goniometer as through the goniometer friction spring 230 resting against the shoulder of the outer disk 225. The goniometer tension spring 230 is held by the adjusting plate 231 which is attached to the goniometer plate 219 by means of screws 232, one of which serves as a pivot and the other to hold the desired adjustment of tension in the friction spring 230.

A boss with a conical recess, needle seat 233, is riveted into the goniometer plate 219 and serves, with the needle lifter 115, to secure the needle when it is off the pivot 110.

*Head assembly*

The head casting 301 is bored and provided with a tapered recess to receive the spindle 208 about which it is clamped by means of the clamp screw 302 (Figs. 1 and 5). Teeth 208' in the upper end of the spindle 208 mesh with teeth provided in the magnetic declination adjusting pinion 303 which is free to rotate in the head body 301 and is kept there by means of the retaining pin 304. The upper end of the declination adjusting pinion 303 is provided with capstan holes 303' as shown. The vernier plate 305 is held to the head casting by screws 306 and is provided for purposes of indicating the vertical angle of any desired setting of the telescope.

The head level case 307 carries a level vial more sensitive than the inside level 121. One end of the head level case 307 is solid and the other end is closed by a plug 308 (Fig. 4). One end of the head level case 307 terminates in a boss in which a pivot screw 309 (Figs. 2 and 5) seats and holds the case 307 against the head 301. The other end of the case 307 terminates in a lug 307' extending at a right angle to the longitudinal axis of the level and through which the adjusting screw 310 passes and against the under side of which lug a stiff semi-circular spring 311 reacts.

The inner surface of the head 301 is finished to receive the horizontal spindle 312 (Figs. 1, 12 and 13). As shown in Fig. 1 this is tapered and as shown in Fig. 13 is provided with three legs or lugs whose outer ends are positioned within the configuration of the recess in the head 301. As shown in Fig. 12, the rear surface of the horizontal spindle 312 is slightly tapered or beveled so that when the spindle 312 is fixed within the recess by means of the spindle screws 313, its horizontal axis slopes slightly downward from a perpendicular to the recessed surface; that is, in its relaxed position, the horizontal axis of the spindle slopes slightly below a plane parallel to the horizontal plane of the base of the instrument.

Horizontal axis adjusting screw 314 acts against the natural spring or resilience of the spindle 312 so as to bring its horizontal axis into parallelism with the horizontal plane of the base of the instrument and the set screw 315 (Fig. 1) which coacts with the upper leg of spindle 312 provides the spindle with additional spring tension as well as retaining the adjustment.

Vertical circle member 316 rotates on the horizontal spindle 312. Shim washers 317 at both ends of the spindle 312 provide for the fit adjustment of the vertical circle member 316 on the horizontal spindle 312. Provided in thicknesses of .0010, .0015, and .0050 inch, at both ends of the spindle, these shims make it possible to adjust the position of the vertical circle member 316 in increments of .0005 inch and, since the taper is 1:10, this provides for a fit adjustment about the spindle of .00005 inch. The outer end of the spindle 312 is threaded to receive the spindle nut 318. Since horizontal spindle 312 is adjustably attached to head 301, dust may enter between the base of spindle 312 and the inner face of the head 301 to which the spindle 312 is attached. Further, there is a possibility of dust entering between vertical circle member 316 and head 301. Dust entering through either of these sources could pass down the column 208 into the cavity of the trough 101 so as to reach the contained mechanism. This is prevented by lens 213 and gasket 202, as well as sealing the cavity of trough 101 against the entry of moisture as briefly mentioned hereinabove.

The recess of the vertical circle member 316 is provided with an internal gear 319 (Figs. 1, 4 and 19) into which the vertical circle slow-motion pinion 320 meshes. The vertical circle slow-motion pinion 320 rotates within an eccentric bushing 321 shown in Figs. 17 and 18. The vertical circle slow-motion pinion 320 is provided with a knob 320' for its rotation; is recessed to receive the retaining pin 322 (Fig. 19); and is grooved to receive the ball 323 which permits it to act either entirely in or entirely out of engagement with the internal gear 319 and prevents damage by partial engagement. The ball 323 is acted upon by the spring 324 which is retained by the threaded cup 325. As shown in Fig. 4, the clamp screw 326 in conjunction with a split sleeve arrangement holds the eccentric bushing 321 after being adjusted for proper mesh of the vertical circle slow-motion pinion 320 in the internal gear 319.

As shown in Figs. 2, 13 and 16, an arcuate shaped brake-block 327 is anchored in the recess of the head 301 by means of the screw 328. This brake-block is fashioned so as to fit loosely within the recess formed in the vertical circle member 316 but is slotted inward from its lower end, as shown in Fig. 13, and is provided with a tapered threaded hole intersecting said slot near the free end thereof so that it may be expanded by means of the vertical circle member friction screw 329 as indicated in Fig. 16. The vertical circle friction screw 329 is free to rotate within the boss provided on the head 301 and is retained by means of the screw 330. Use of the friction screw 329 permits controlling the freedom of motion of the vertical circle member or stopping it due to the lower portion of the convex surface of brake-block 327 being engageable with the inner surface of vertical circle member 316.

A horizontal angle slow-motion clamp ring 332 show in Fig. 15 rotatably and threadably carries the slow-motion screw 333 and the spring plunger 334 which acts against the slow-motion pin 335 screwed into and stationarily carried by the head 301 (Fig. 1). The slow-motion ring 332 is bored to rotate with head 301 freely about the vertical spindle bushing 207 and is slotted and provided with the clamp screw 336 so that the slow motion clamp ring 332 may be tightened on the vertical spindle bushing 207 by means of the clamp lever 337. A right-hand thread is used for the clamp lever 337 on the clamp screw 336, and the other end of the clamp screw 336 is provided with a smaller left-hand thread which screws into the body of the clamp ring 332 and extends beyond for the left-hand lock nut 338. This arrangement of right- and left-hand threads makes it possible to adjust the clamp screw 336 so that the clamp lever 337 will tighten the clamp ring 332 with the clamp lever 337 conveniently located.

The horizontal slow-motion spring 339 held by the threaded cup 340 acts against the spring plunger 334. The horizontal slow-motion screw 333 consists of a headed pin 333' which passes through the body of the slow-motion screw 333 where it is held by means of a slotted nut 333" threadably secured to the outer end of said pin. This arrangement serves to give the slow-motion pin 335 uniform motion and at the same time prevents unintentional removal of the slow-motion screw 333 from the clamp ring 332. Rotation of slow motion screw 333 in one direction after tightening clamp lever 337 moves the pin 335 and head 301 in one direction and reverse rotation of screw 333 permits spring pressed plunger 334 to move said pin and head in the opposite direction.

A sight tube 401 shown in Fig. 4 is provided for viewing the needle 109 and inside level 121 of the instrument. It is held to the vertical circle member 316 by means of three screws 402 and carries the lens 403 and the mirror 404 which, with the mirror 331 directs the sight of the observer down the hollow vertical column 208, regardless of the position of the sight tube 401 about the horizontal axis. Sight tube casting 401 is provided with two bosses 401' which are bushed and bored to receive the guide rods 501 and 502 which support the telescopic sight of the instrument. One of these guides carries a safety friction shoe 405 and spring 406 held by the screw 407 (Fig. 2).

The p. d. (interpupillary diameter) screw 408 is threaded into a boss 408', Figs. 2 and 3, which is integral with and transverse to one of the bosses 401' and is used for retaining the adjustment of the eye-pieces of the instrument to suit eyes of the observer. This p. d. screw 408 is shown in cross-section in Fig. 14. It consists of a screw body which is bored to receive a Bakelite plunger 408' that is acted on by a short stiff helical spring which is held within the head of the screw by a cup press-fitted within the head of the screw 408 or held there by peening over the rim of the head of said screw onto said cup. This arrangement is provided so that the smooth surface of the guide 502 will not be marred by the action of the p. d. screw 408. An annular recess in the outer surface of the p. d. screw 408 midway of its ends and the retaining pin 409 received at one end within said recess serve to prevent loss of the p. d. screw 408.

The two guides 501 and 502 are tapered at one end and seat into the sight body 503 where they are held by means of the screws 504. The prism base 505 is recessed slightly on each face so as to receive the hypotenuse of each of the two Porro prisms 506. Each of these Porro prisms 506, as shown in Fig. 1, is held into its recess in the prism base 505 by means of a retaining strip 507 which is sufficiently wide to carry the screws 509. Two wires 508 pass over the ends of each of the retaining strips 507 and the ends of these wires 508 are fixed in the prism base 505 by soldering or other common means. Tightening the screws 509 against the flat surface at the apex of each prism 506 brings the retaining strip 507 up against the wires 508 so as to draw the prism 506 down into its recessed seat in the prism base 505. The prism house 510 and the telescope body 503 are drawn together against the prism base 505 by means of the screws 511, shown in Figs. 1 and 4, which pass through the prism base 505.

The objective mount 512 carries an objective lens 513 (Fig. 6) which is held in place by means of the threaded ring 514 screwed into the objective mount 512. The screw 515 shown in Fig. 4 fits into a helical recess milled in the outer surface of the objective mount 512, providing for focusing. The optical system includes a glass reticule 516 with engraved stadia- and crosshairs preferably of the design shown in Fig. 22. In this design the double vertical lines may be made to indicate increments of angle useful in surveying, as, for example, one minute of arc and one mil. The reticule glass 516 is held in the reticule body 517 which is adjustable within the sight body 503 by means of the reticule screws 518. Washers 519 are provided to exclude dust. The Kellner eye-piece is constructed of a body 520 which is rotatable within the telescope bushing 521. A set screw and helical slot provide for adjustment of the eye-piece, at the same time preventing its loss. The field lens 522 is held in place by means of the spring spacer 523 which seats against the eye-lens mount 524 which holds the eye-lens 525. The eye-piece 526 is screwed onto the eye-lens mount 524 and is held there by means of the set screw 527.

The telescope is provided with a level vial mounted in the telescope level tube 528. At one end a tapered boss is seated into the telescope body 503 and pivots telescope level 528 where it is held by means of the screw 529. At the other end the telescope level body is provided with a lug and an adjusting screw 530 and a U-shaped spring 531 (Fig. 21) having apertures to receive said screw for vertically adjusting the telescope level.

The sensitivity of the levels of the instrument is preferably as follows: The lower element of the inside level should be of such sensitivity as merely to indicate, when the bronze ball 124 is in the circular level index ring, that the magnetic needle is free. The upper element of the inside level should have a sensitivity so as conveniently to indicate with an accuracy of 5 minutes of arc when the instrument is hand-held. The head level 307 should have a sensitivity of about 60 seconds per division, and preferably should be of the reversion type.

While the gears of the goniometer assembly are manufactured to close tolerances so as to mesh precisely, slight wear existing between the respective gears does not impair the accuracy of the instrument since rotation of the base and goniometer housing about the vertical axis relative to the sighting head or vice versa is always accomplished in one direction only, that indicated by the respective arrows on the head and goniometer housing (Figs. 2 and 4). Such unidirectional rotation renders backlash between gears of no effect on the final results of readings made with the instrument. The level 120' within the compass base is also provided with an arrow (Figs. 7, 9 and 11) to indicate the direction in which the needle of the compass should approach the needle index 114 in order that the same relative rotation shall take place between the head and goniometer housing. Errors resulting from backlash are thus completely avoided.

While the invention and the various items and features thereof have been illustrated and described in their preferred embodiments, it is to be understood that the invention is not to be limited to the precise details herein illustrated and described since the same may be carried out in other ways, falling within the scope of the invention as claimed.

What I claim is:

1. An instrument of the class described comprising in combination, sighting means, a trough compass having an elongated needle mounted for oscillation through a limited angle about a pivot, an index means positioned in the line of sight of said sighting means, and a pointer connected to one arm of said needle and arranged to move in a plane above said index means and be viewed through said sighting means relative to said index means, the side walls of said trough of said compass being shaped to conform substantially to the extreme positions of said needle during said oscillatory movement, whereby such movement of said needle induces current within said walls opposing the current within said needle and thereby serving to damp the motions of the compass needle to facilitate quickly bringing the needle to rest.

2. An instrument of the class described comprising in combination, sighting means, a member formed from material of high electrical conductivity and having an elongated trough therein, a pointed pivot projecting upward appreciably above the bottom of said trough, the end surfaces of said trough approximating segments of a sphere the center of which is substantially at said pivot, a magnetic compass needle arranged to be viewed through said sighting means and having intermediate its ends and substantially above the level thereof a bearing pivotally mounted on said pivot, said trough having an outline in plan view defined substantially by the extreme positions of said needle when swung in opposite directions through a limited angle, whereby oscillatory movement of the compass needle in coming to rest will induce within said trough member a secondary magnetic field acting in a direction opposite to that of the magnetic current within said needle and serving to damp the movement of said needle to facilitate quickly bringing the needle to rest, and an elongated pointer of circular cross-section projecting from one end of and above said needle, the axis of said pointer intersecting the point of rotation of said pivot.

3. An instrument of the class described comprising in combination, sighting means, a member formed from material of high electrical conductivity and having a trough therein, a pivot fixed to and projecting into said trough from the base thereof, and a magnetic compass needle pivotally mounted on said pivot and having a pointer on one arm thereof in radial alignment with the point of said pivot and arranged to be viewed through said sighting means, said trough having an elongated outline in plan view tapered inward from opposite ends toward the center and arcuate at the ends thereof and defined substantially by the extreme positions of the sides and ends of said needle when swung in opposite directions through a limited angle, whereby oscillatory movement of the compass needle in coming to rest will induce within the walls of said trough member a secondary magnetic field acting in a direction opposite to that of the magnetic current within said needle and serving to damp the movement of said needle to facilitate quickly bringing the needle to rest.

4. A compass comprising in combination, a pivot, a magnetic needle having a bearing intermediately of its ends and spaced substantially above the longitudinal axis of said needle, said bearing resting upon said pivot to support said needle for oscillation and rotation about said pivot, and a pointer supported by one end of said needle and the free end projecting in parallelism to said needle, said pointer being circular in cross-section and the axis of said free end thereof intersecting the point of rotation of said bearing about said pivot.

5. An instrument of the class described comprising in combination, sighting means, an index means of predetermined width in the line of vision of said sighting means, and a pivoted compass needle having a pointer circular in cross-section arranged to be viewed through said sighting means vertically from above and in relation to said index means, said pointer being movable in a plane above said index means and having a diameter precisely equal to the width of said index means to facilitate visually aligning it and said needle pointer exactly and the axis of said pointer extending through the point of rotation of said needle about its pivot.

LEW SUVERKROP.

REFERENCES CITED

The following references are of record in the file of this patent:

UNITED STATES PATENTS

| Number | Name | Date |
|---|---|---|
| 211,968 | Capek | Feb. 4, 1879 |
| 234,332 | Randolph | Nov. 9, 1880 |
| 264,061 | Blattner | Sept. 12, 1882 |
| 286,606 | Gurley et al. | Oct. 16, 1883 |
| 297,164 | Randolph | Apr. 22, 1884 |
| 413,118 | Warner | Oct. 15, 1889 |
| 446,956 | Soltmann et al. | Feb. 24, 1891 |
| 453,160 | Paoli | May 26, 1891 |
| 470,076 | Randolph | Mar. 1, 1892 |
| 503,164 | Ritchie | Aug. 15, 1893 |
| 533,465 | Hooper | Feb. 5, 1895 |
| 774,515 | Geier | Nov. 8, 1904 |
| 814,292 | Hutchins | Mar. 6, 1906 |
| 839,511 | Reichenbach et al. | Dec. 25, 1906 |
| 955,911 | Saegmuller et al. | Apr. 26, 1910 |
| 994,903 | Berger | June 13, 1911 |
| 1,036,096 | Graves | Aug. 20, 1912 |
| 1,068,159 | Odhner | July 22, 1913 |
| 1,105,149 | Lyford et al. | July 28, 1914 |
| 1,181,992 | Churchill et al. | May 9, 1916 |
| 1,209,107 | Berger | Dec. 19, 1916 |
| 1,307,637 | Olan | June 24, 1919 |
| 1,313,732 | Raffo | Aug. 19, 1919 |
| 1,412,442 | Ahmels | Apr. 11, 1922 |
| 1,439,218 | Bancalari | Dec. 19, 1922 |
| 1,445,922 | Vaughan | Feb. 20, 1923 |
| 1,474,394 | Warburg | Nov. 20, 1923 |
| 1,496,390 | Sundhaussen | June 3, 1924 |
| 1,502,804 | Windham | July 29, 1924 |
| 1,665,002 | Von Gruber | Apr. 3, 1928 |
| 1,799,648 | Salzgeber | Apr. 7, 1931 |
| 1,897,282 | Steinle | Feb. 14, 1933 |
| 1,909,135 | Svenson | May 16, 1933 |
| 1,969,697 | Kiefer | Aug. 7, 1934 |
| 1,972,708 | Hull | Sept. 4, 1934 |
| 1,973,716 | Karnes | Sept. 18, 1934 |
| 2,003,179 | Faus | May 28, 1934 |
| 2,008,475 | Spiller | July 16, 1935 |
| 2,022,516 | Owen | Nov. 26, 1935 |
| 2,060,766 | West | Nov. 10, 1936 |
| 2,107,124 | Markert | Feb. 1, 1938 |
| 2,111,829 | Winterer et al. | Mar. 22, 1938 |
| 2,127,878 | Martin | Aug. 23, 1938 |
| 2,231,036 | Suverkrop | Feb. 11, 1941 |
| 2,305,233 | Blaschke | Dec. 15, 1942 |
| 2,399,909 | Boughton et al. | May 7, 1946 |

FOREIGN PATENTS

| Number | Country | Date |
|---|---|---|
| 24,792 | Great Britain | Nov. 8, 1907 |
| 26,329 | Great Britain | Nov. 28, 1907 |
| 69,449 | Norway | Sept. 8, 1947 |
| 490,951 | France | Jan. 17, 1919 |
| 576,370 | France | May 10, 1924 |